United States Patent
Yu et al.

(10) Patent No.: US 8,942,447 B2
(45) Date of Patent: Jan. 27, 2015

(54) METHOD AND APPARATUS FOR TISSUE REGION IDENTIFICATION

(71) Applicant: Sony Corporation, Tokyo (JP)

(72) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/671,143

(22) Filed: Nov. 7, 2012

(65) Prior Publication Data

US 2014/0126785 A1 May 8, 2014

(51) Int. Cl.
*G06K 9/00* (2006.01)
(52) U.S. Cl.
CPC ................... *G06K 9/0014* (2013.01)
USPC ........................................ 382/128
(58) Field of Classification Search
None
See application file for complete search history.

(56) References Cited

U.S. PATENT DOCUMENTS

| | | | |
|---|---|---|---|
| 4,945,478 A * | 7/1990 | Merickel et al. | 382/131 |
| 7,177,454 B2 | 2/2007 | McLaren et al. | |
| 7,430,320 B2 * | 9/2008 | Lee et al. | 382/173 |
| 7,668,342 B2 | 2/2010 | Everett et al. | |
| 7,747,085 B2 | 6/2010 | Kostrzewski et al. | |
| 7,868,900 B2 | 1/2011 | Sirohey et al. | |
| 2003/0144585 A1 | 7/2003 | Kaufman et al. | |
| 2006/0104516 A1 * | 5/2006 | Lee et al. | 382/199 |
| 2006/0147101 A1 * | 7/2006 | Zhang et al. | 382/131 |
| 2007/0147697 A1 | 6/2007 | Lee et al. | |
| 2008/0069477 A1 * | 3/2008 | Engels et al. | 382/291 |
| 2008/0159604 A1 * | 7/2008 | Wang et al. | 382/128 |
| 2008/0212866 A1 | 9/2008 | Lett et al. | |
| 2009/0081775 A1 * | 3/2009 | Hodneland et al. | 435/317.1 |
| 2009/0297002 A1 * | 12/2009 | Zhang et al. | 382/128 |
| 2010/0134517 A1 * | 6/2010 | Saikaly et al. | 345/619 |
| 2010/0215227 A1 | 8/2010 | Grunkin et al. | |
| 2011/0019094 A1 * | 1/2011 | Rossignol et al. | 348/607 |
| 2012/0219200 A1 * | 8/2012 | Reeves et al. | 382/131 |
| 2012/0294502 A1 * | 11/2012 | Chan et al. | 382/131 |
| 2013/0051676 A1 * | 2/2013 | Wehnes et al. | 382/190 |

OTHER PUBLICATIONS

Sato et al ("Three-dimensional multi-scale line filter for segmentation and visualization of curvilinear structures in medical images", Medical Image Analysis vol. 2, No. 2, pp. 143-168, Oxford University Press, 1998).*
Peter Gann, Mark Lloyd and Chris M. van der Loos "inForm Advanced Image Analysis Software—For Accurately quantifying Biomarkers in Tissue Sections" PerkinElmer, Inc. downloaded on Feb. 6, 2013 from : http://www.perkinelmer.com/CMSResources/Images/44-144380PRD_inForm.pdf, 6 pages.
International Search Report and Written Opinion mailed Jan. 17, 2014 for Application No. PCT/US2013/67976, 9 pages.

* cited by examiner

*Primary Examiner* — Shervin Nakhjavan
(74) *Attorney, Agent, or Firm* — Moser Taboada

(57) ABSTRACT

Certain aspects of an apparatus and method for method and apparatus for tissue region identification may include segmenting the image into a plurality of regions, filtering out regions in the plurality of regions which are curvilinear, and isolating a target area where the tissue sample is identified as the plurality of regions not filtered.

20 Claims, 5 Drawing Sheets

METHOD AND APPARATUS FOR TISSUE REGION IDENTIFICATION

CROSS-REFERENCE TO RELATED APPLICATIONS/INCORPORATION BY REFERENCE

This application makes reference to: U.S. patent application Ser. No. 13/671,190 filed on Nov. 7, 2012, which issued as U.S. Pat. No. 8,824,758 B2 on Sep. 2, 2014.

Each of the above referenced applications is hereby incorporated herein by reference in its entirety.

FIELD

Certain embodiments of the disclosure relate to pathology imaging. More specifically, certain embodiments of the disclosure relate to a method and apparatus for tissue region identification.

BACKGROUND

In the area of biology and medicine, understanding cells and their supporting structures in tissues and tracking their structure and distribution changes is crucial to advancing medical knowledge in disease diagnoses. Histology is the study of the microscopic anatomy of tissues and is essential in diagnosing disease, developing medicine and many other fields. In histology, thin slices of tissue samples are placed on one or more slides and then examined under a light microscope or electron microscope. Often, however, the tissue samples are placed in any portion of the slide and the slide itself may be oriented in different ways due to variable layouts in digital pathology systems, causing difficulty in accurate location of a target area on a slide. In addition, comparing an input image of a tissue sample to other input images of similar tissue samples becomes difficult because the tissue samples may be stretched or compressed and the resulting slide image becomes distorted.

Therefore there is a need in the art for a method and apparatus for tissue region identification in digital pathology.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for tissue region identification in digital pathology substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or method for tissue region identification in digital pathology. According to one embodiment, a digital pathology image is segmented into a plurality of regions each containing structures or objects which may or may not be relevant tissue or background artifacts and the like. Each region is subjected to filtering where objects in the region are determined. If the objects are determined to be curvilinear segments, these objects are considered to be background data and not contain relevant data to the tissue sample. Once all curvilinear portions of the data are filtered out, artifacts and background are determined and removed from the remaining regions. Separate regions of interest are identified in the remaining regions by separating multiple objects in the tissue sample, thereby identifying a tissue region in a digital pathology image. As used herein, "curvilinear" means any image portion that is substantially one-dimensional, that is, a curved or straight line.

Figure 1:
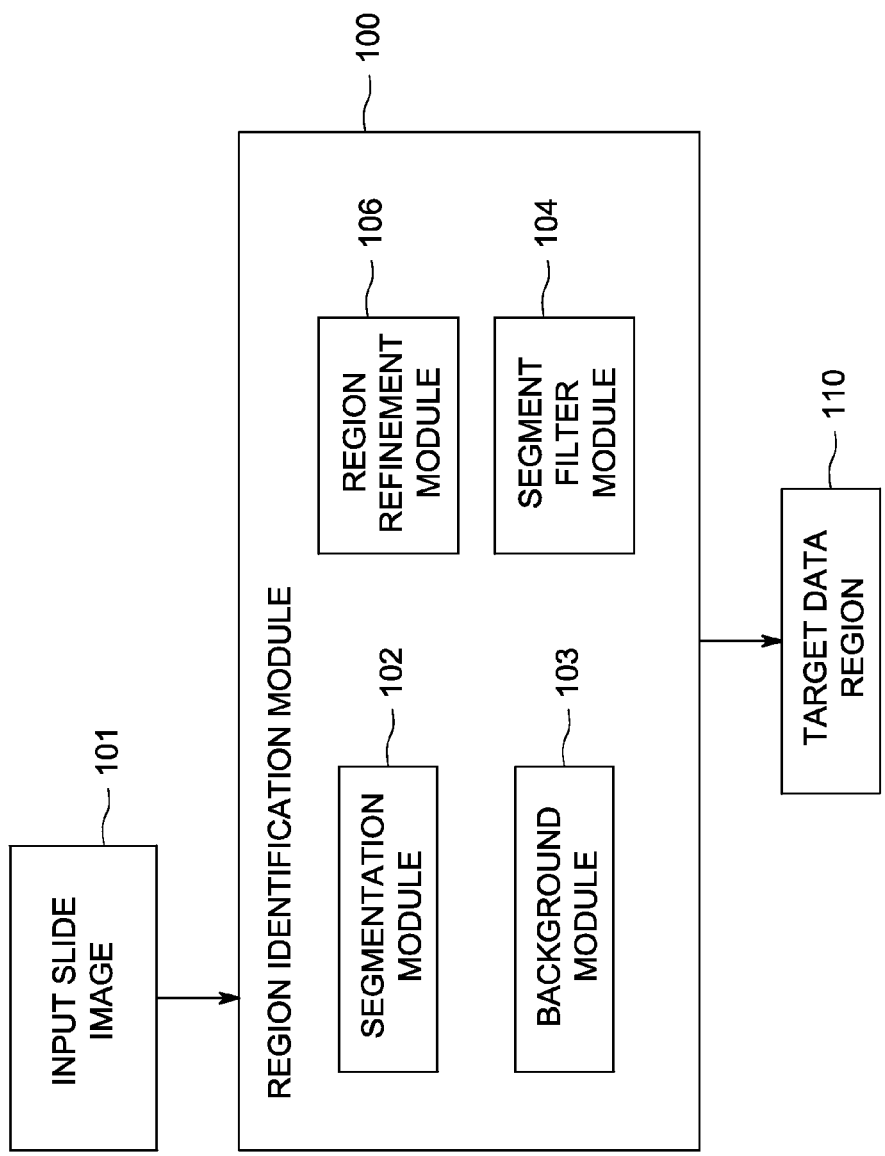
FIG. 1 is a block diagram illustrating a tissue region identification module in accordance with an embodiment of the disclosure.

FIG. 1 is a block diagram illustrating a tissue region identification module 100 in accordance with an embodiment of the disclosure. The tissue region identification module 100 comprises a segmentation module 102, a background module 103, a segment filter module 104, and a region refinement module 106. The tissue region identification module 100 has an input slide image 101 as input. According to some embodiments, the input slide image 101 is a digital pathology image which is stained with one of various color dyes to enhance cellular visibility.

The input slide image 101 is first divided into a plurality of segments by the segmentation module 102. According to one embodiment, the segmentation module 102 divides the image 102 into X segments. Disparate regions are separated based on spatial proximity, as well as the textural and contrast characteristics in each of the X segments. As a result, tissue regions in the slide image 101 are considered foreground and segmented from regions of surrounding texture which are not connected to the tissue regions. In some embodiments, the input image 101 is 100,000 pixels by 100,000 pixels.

The background module 103 estimates background distribution from regions in the segmented image that are not considered to be foreground.

The segment filter module 104 determines which portions of the input slide image 101 are tissue regions and which are merely artifacts or weak tissue regions and are one-dimensional. The segment filter module 104 performs filtering on each region produced by the segmentation module 102. The portions in each region which are deemed to be artifacts or weak tissue areas are filtered from the image. According to one exemplary embodiment, if a portion of the region contains curvilinear segments, then that portion is deemed to not contain a target area because, portions that are curvilinear are often artifacts.

Therefore, segment filter module 104 filters out from the input slide image 101 any portions which resemble curvilinear line segments. A curvilinear line segment is any segment that resembles a one dimensional curve or line. According to one embodiment of the present invention, a portion of the input slide image can be determined to be curvilinear by applying an area ratio test.

The area ratio test is applied by finding the minimum x and y and the maximum x and y of a portion of the segment input to the segment filter module 104, when viewing the segment on the x-y plane. The min/max x, y provide the coordinates of a bounding box for enclosing the suspected curvilinear portion of the current segment. An area is then computed for the bounding box region. An area is further computed for the full length of the input region The ratio of the bounding box area to the area of the input region is compared to a threshold value. If the ratio is smaller than the threshold value, the segment within the bounding box is determined to be either a line or the structure has a very sparse point distribution with little useful information, and is deemed an artifact. Therefore it is discarded. However, if the ratio is equal to or higher than the threshold value, the bounded segment is significant and is kept for further processing and is not deemed an artifact.

The segment filter module 104 further can fit a particular portion or segment to a curve to determine if the portion is curvilinear. If the segment fits a curve or a straight line very closely, the segment is discarded as lacking important information.

The region refinement module 106 identifies the background and isolates the target data region. According to some embodiments, the region refinement module 106 also performs multiple object separation where there is greater than one region of interest. According to some embodiments, the region refinement algorithm is described in related application.

According to one embodiment, the region refinement module 108 performs multiple object separation. The region refinement module 108 calculates pixel separation between boundaries of objects in the input image 101. If the number of pixels between two objects is below a particular threshold value, the two objects are considered as a single object. If the number of pixels between the two objects is greater than the predetermined threshold value, the objects are separated.

However, if two objects in a region are separated by a diagonal distance, for example, a 45 degree separation, a more complex method is used to determine the pixel distance between the two objects. In one embodiment, a tight region is computed around each object, and this boundary is used as a separation marker. The distance from the boundary to another object is examined to determine whether the pixel distance is greater or smaller than the predetermined threshold value.

The region refinement module 108 refines the non-filtered portions of the plurality of regions into a target data region 110. The target data region 110 is the region in the input image 101 where the tissue sample, or the significant portions of the tissue region, is identified.

Figure 2:
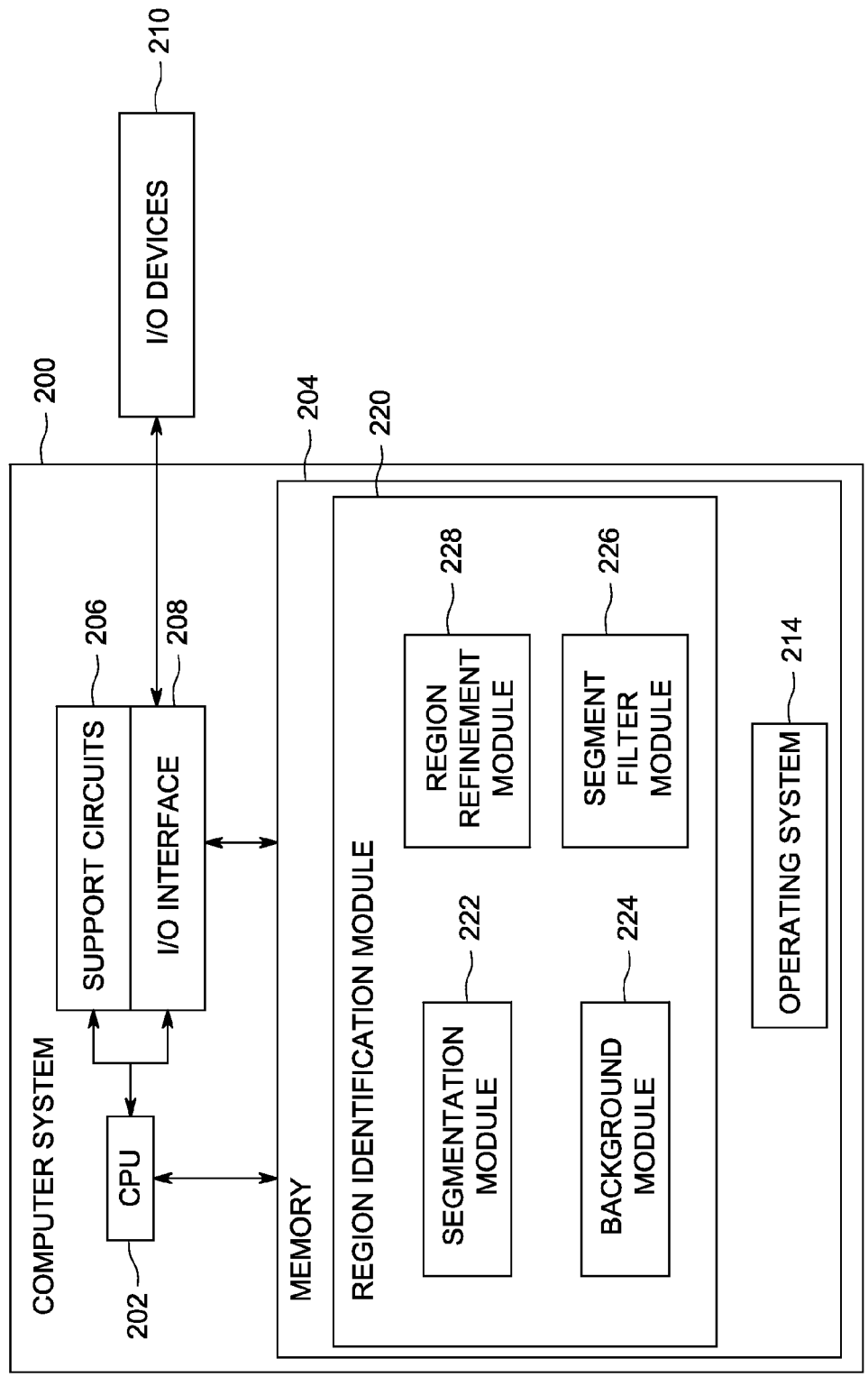
FIG. 2 is a block diagram of a computer system for implementing a tissue region orientation module in accordance with embodiments of the present invention.

FIG. 2 is a block diagram of a computer system 200 for implementing the orientation module 100 in accordance with embodiments of the present invention. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, input/output (I/O) interface 208, and the like. The I/O interface 208 may be directly coupled to the memory 204 or coupled through the supporting circuits 206. The I/O interface 208 may also be configured for communication with input devices and/or output devices 210, such as, network devices, various storage devices, mouse, keyboard, displays, sensors and the like.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise the region identification module 220, further comprising the segmentation module 222, the segment filter module 226, the background module 224 and the region refinement module 228.

The computer 200 may be programmed with one or more operating systems (generally referred to as operating system (OS) 214, which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 214 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 3:
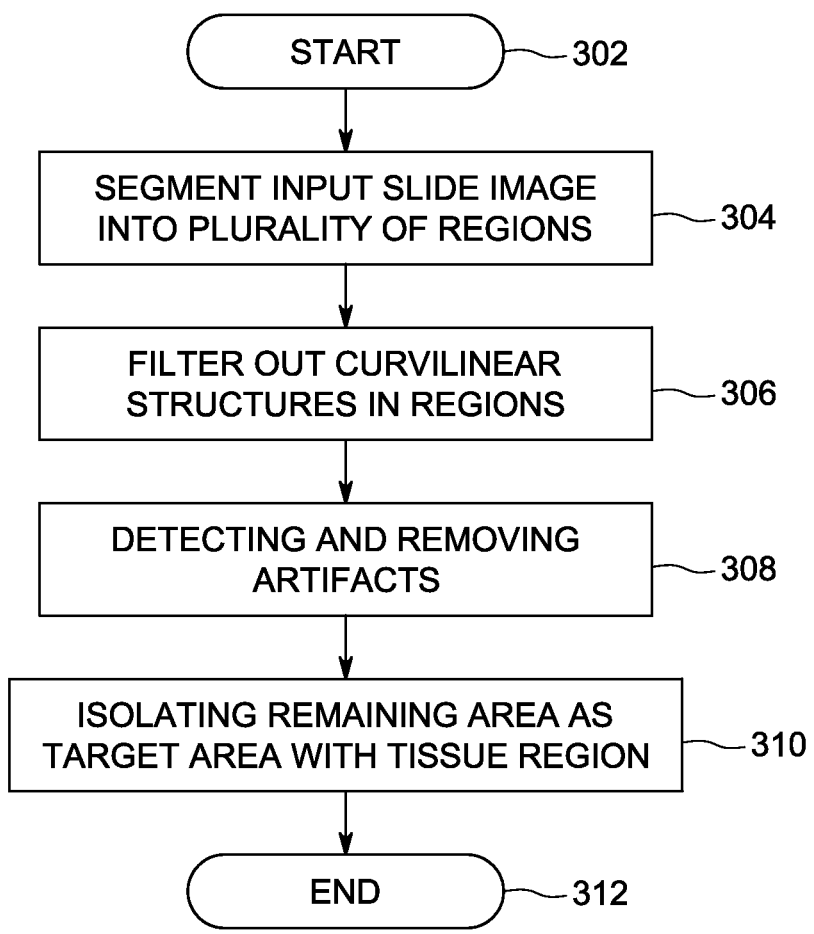
FIG. 3 is a flow diagram illustrating a method for estimating a tissue region in a slide image according to exemplary embodiments of the present invention.

FIG. 3 is a flow diagram illustrating a method 300 for estimating a tissue region in a slide image according to exemplary embodiments of the present invention. The method 300 is an implementation of the region identification module 220 as executed by the CPU 202 of the computer system 200, shown in FIG. 2.

The method 300 starts at step 302 and proceeds to step 304. At step 304, the segmentation module 222 segments an input slide image into a plurality of regions based on detected structures and objects in the image.

The method then proceeds to step 306, where structures which are curvilinear (that is, substantially one-dimensional) are determined to be part of the background and are filtered out from the foreground by the segment filter module 226. As described above with reference to FIG. 1, the segment filter module 226 performs various different tests such as the Area Ratio test, fitting to curves, and the like to determine whether a structure or segment is substantially one-dimensional and therefore contains only background data, or contains relevant tissue sample data.

At step 308, the background module 224 detects and removes artifacts across the plurality of regions. At step 310, the remaining area is isolated as the target area, because all background information has been identified and removed. Thus, what is left is considered foreground data and relevant. Thus, the sample tissue region has been estimated and identified. The method then ends at step 312.

Figure 4:
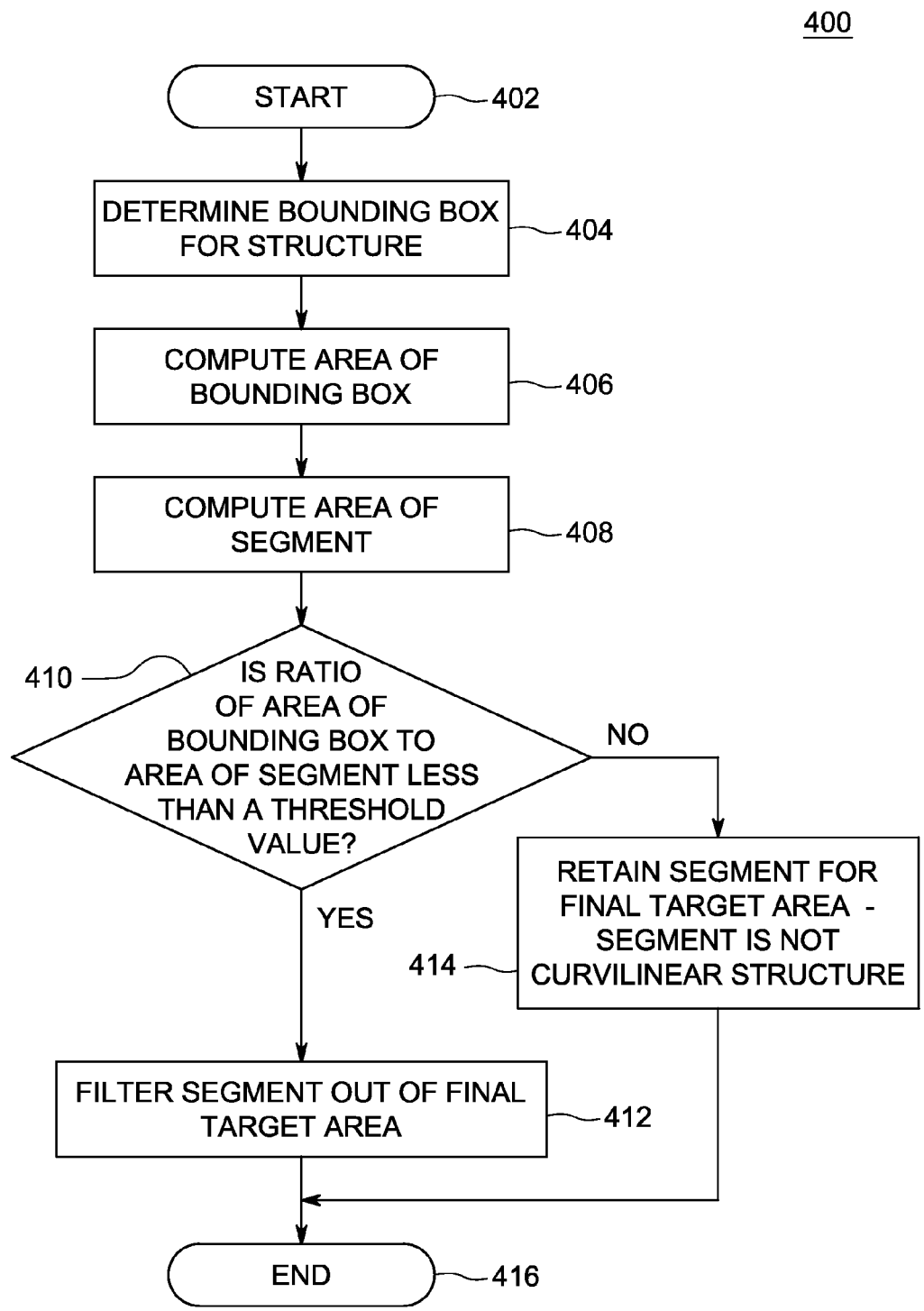
FIG. 4 is a flow diagram illustrating a method for determining if a segment is background data according to exemplary embodiments of the present invention.

FIG. 4 is a flow diagram illustrating a method 400 for determining if a segment is background data according to exemplary embodiments of the present invention. The method 400 is an implementation of the segment filter module 226 as executed by the CPU 202 of the computer system 200, shown in FIG. 2.

The method 400 starts at step 402 and proceeds to step 404. At step 404, a bounding box is determined for a structure or region that is possibly curvilinear. The bounding box is determined by determining the minimum x, minimum y and maximum x and maximum y of the structure in the region.

At step 406, the area of the bounding box is computed. At step 408, the area of the segment within which the structure lies is computed. The method proceeds to step 410 where a ratio of the area of the bounding box to the area of the segment is calculated. This ratio will give a measure of an estimate of how much area the structure takes up of the region.

At step 410, if the ratio is very small, i.e., smaller than a particular threshold value, the method moves to step 412. At step 412, the segment filter module 226 determines the structure is curvilinear, and is background data and is filtered out of the final target area. If the ratio is not less than a threshold value, the structure is deemed as not curvilinear, and is considered relevant and the segment is retained as part of the final area. The method 400 ends at step 416.

Figure 5:
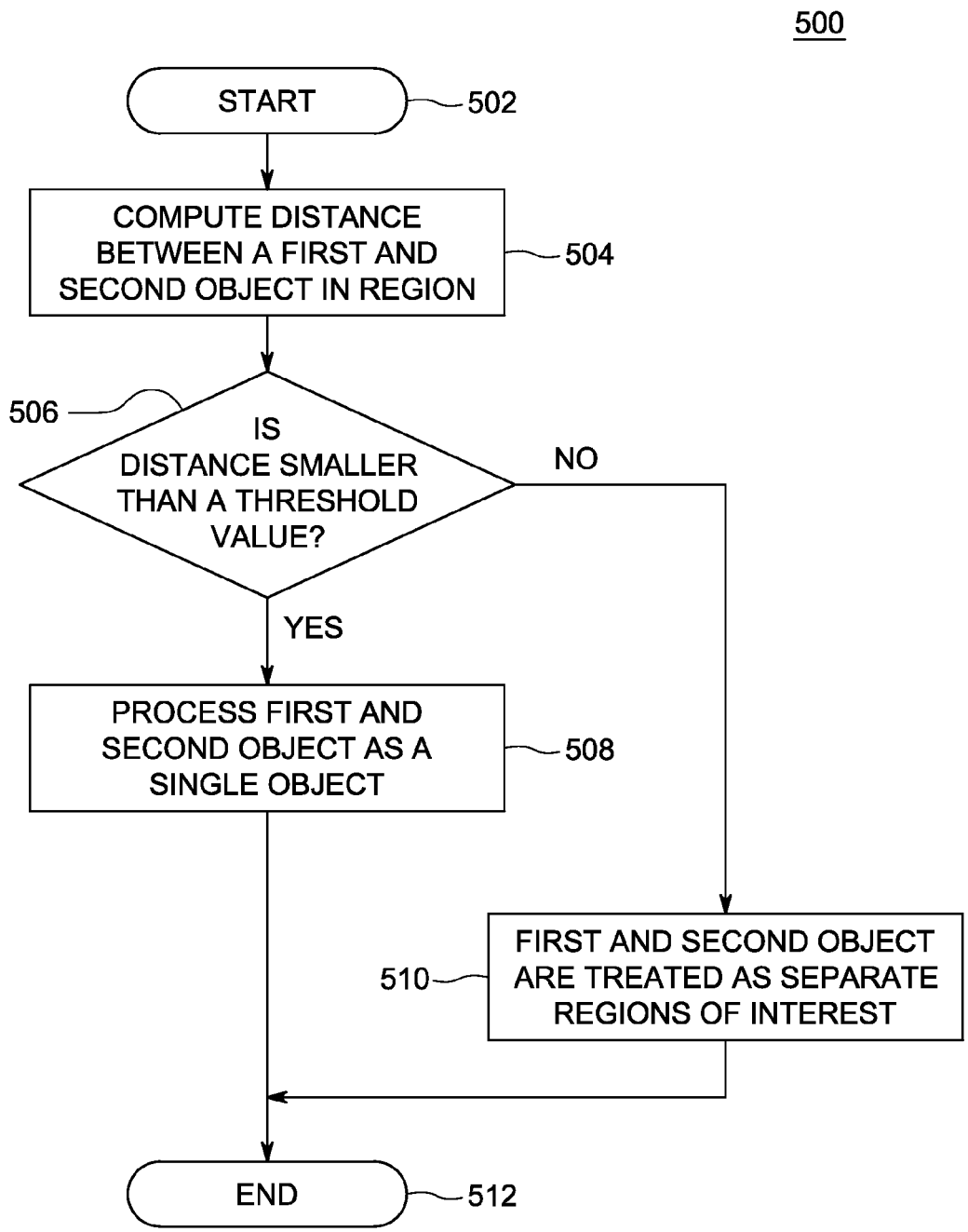
FIG. 5 is a flow diagram illustrating a method for separating multiple objects in an input tissue region according to exemplary embodiments of the present invention.

FIG. 5 is a flow diagram illustrating a method 500 for separating multiple objects in an input region according to exemplary embodiments of the present invention. The method 500 is an implementation of a portion of the region refinement module 228 as executed by the CPU 202 of the computer system 200, shown in FIG. 2.

The method 500 starts at step 502 and proceeds to step 504. At step 504, the region refinement module 228 computes the distance between a first and second object in the input region. When the two objects are vertically or horizontally displaced, the distance between the two objects is determined as the pixel distance between the boundaries of each object in a horizontal or vertical direction. However, if the objects are displaced at an angle from other, tight regions are computed around each object and distances are calculated from the borders of these regions.

At step 506, the region refinement module 228 determines whether the distance is smaller than a threshold value. If the distance is smaller than a threshold value, the first and second objects are considered as single objects at step 508. If the distance is not smaller than a threshold value, the first and second objects are treated as separate objects and distinct regions of interest at step 510. The method ends at step 512.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method for identifying a tissue region in a digital pathology image comprising:
    segmenting the image into a plurality of regions;
    filtering out regions in the plurality of regions to exclude from the tissue region by fitting segments in the each of the plurality of regions to a curve to determine whether the segments are curvilinear; and
    isolating a target area where the tissue region is identified as the plurality of regions remaining after the filtering.

2. The method of claim 1 further comprising:
    filtering out regions in the plurality of regions based on one or more of spatial proximity, texture similarity and contrast similarity.

3. The method of claim 1, wherein filtering out curvilinear portions further comprises:
    computing an area of a bounding box enclosing a structure in a region of the plurality of regions;
    computing an area of the region; and
    determining the structure is an artifact when a ratio of the area of the bounding box to the area of the region is smaller than a threshold value.

4. The method of claim 1 further comprising:
    detecting and removing artifacts from the plurality of regions.

5. The method of claim 4 further comprising:
    detecting distance between potential multiple objects, the potential multiple objects separated by a diagonal distance, in the plurality of regions; and
    combining the potential multiple objects into a single object when the detected distance is below a particular threshold.

6. The method of claim 5, wherein detecting distance further comprises:
    computing a region around each of a first and second object;
    determining a boundary around the region; and
    calculating a separation distance between the boundary of the first object and the boundary of the second object.

7. An apparatus for identifying a tissue region in a digital pathology image comprising one or more processors for executing:
    a segmentation module configured for segmenting the image into a plurality of regions;
    a segment filter module configured for filtering out regions in the plurality of regions to exclude from the tissue region by fitting segments in the each of the plurality of regions to a curve to determine whether the segments are curvilinear; and
    a region refinement module configured for isolating a target area where the tissue region is identified as the plurality of regions not filtered out.

8. The apparatus of claim 7 wherein the segmentation module further separates different regions based on spatial proximity, texture similarity and contrast similarity.

9. The apparatus of claim 7, wherein segment filter module further computes an area of a bounding box enclosing a structure in a region of the plurality of regions, compute an area of the region and determine the structure is an artifact when a ratio of the area of the bounding box to the area of the region is smaller than a threshold value.

10. The apparatus of claim 7, further comprising a background module for detecting and removing artifacts from the plurality of regions.

11. The apparatus of claim 7, wherein the region refinement module further detects a distance between multiple objects in the plurality of regions, the potential multiple objects separated by a diagonal distance, and combines the potential multiple objects into a single object when the detected distance is below a particular threshold.

12. The apparatus of claim 11, wherein the region refinement module further:
computes a region around each of a first and second object;
determines a boundary around the region;
calculates a separation distance between the boundary of the first object and the boundary of the second object.

13. A computer-implemented method for identifying a tissue region in a digital pathology image comprising:
segmenting the image into a plurality of regions;
filtering out regions in the plurality of regions to exclude from the tissue region by:
computing an area of a bounding box enclosing a structure in a region of the plurality of regions; and
determining the structure is an artifact to exclude when a ratio of the area of the bounding box to a computed area of the region is smaller than a threshold value; and
isolating a target area where the tissue region is identified as the plurality of regions remaining after the filtering.

14. The method of claim 13 further comprising:
filtering out regions in the plurality of regions based on one or more of spatial proximity, texture similarity and contrast similarity.

15. The method of claim 13, further comprising:
filtering out regions in the plurality of regions to exclude from the tissue region by fitting each of the plurality of regions to a curve to determine if the each of the plurality of regions are curvilinear.

16. The method of claim 13 further comprising:
detecting distance between potential multiple objects, the potential multiple objects separated by a diagonal distance, in the plurality of regions; and
combining the potential multiple objects into a single object when the detected distance is below a particular threshold; and
excluding the single object from the tissue region.

17. The method of claim 16, further comprising:
treating a first object and a second object of the potential multiple objects as separate regions of interest when the detected distance is equal or greater than the particular threshold.

18. The method of claim 16, wherein detecting distance further comprises:
computing a region around each of a first and second object;
determining a boundary around the region; and
calculating a separation distance between the boundary of the first object and the boundary of the second object.

19. The method of claim 16, wherein if the a first object and a second object of the potential multiple objects are horizontally or vertically displaced from each other, a separation distance is calculated as the number of pixels between the first object and the second object.

20. The method of claim 13, wherein the bounding box is determined by determining a minimum x, minimum y, maximum x and maximum y of the structure in the region, relative to a corner of the region.

* * * * *